Nov. 6, 1962   D. B. VAN HORN   3,062,562
EQUALIZER FOR HARROW EVENER
Filed March 3, 1961   2 Sheets-Sheet 2
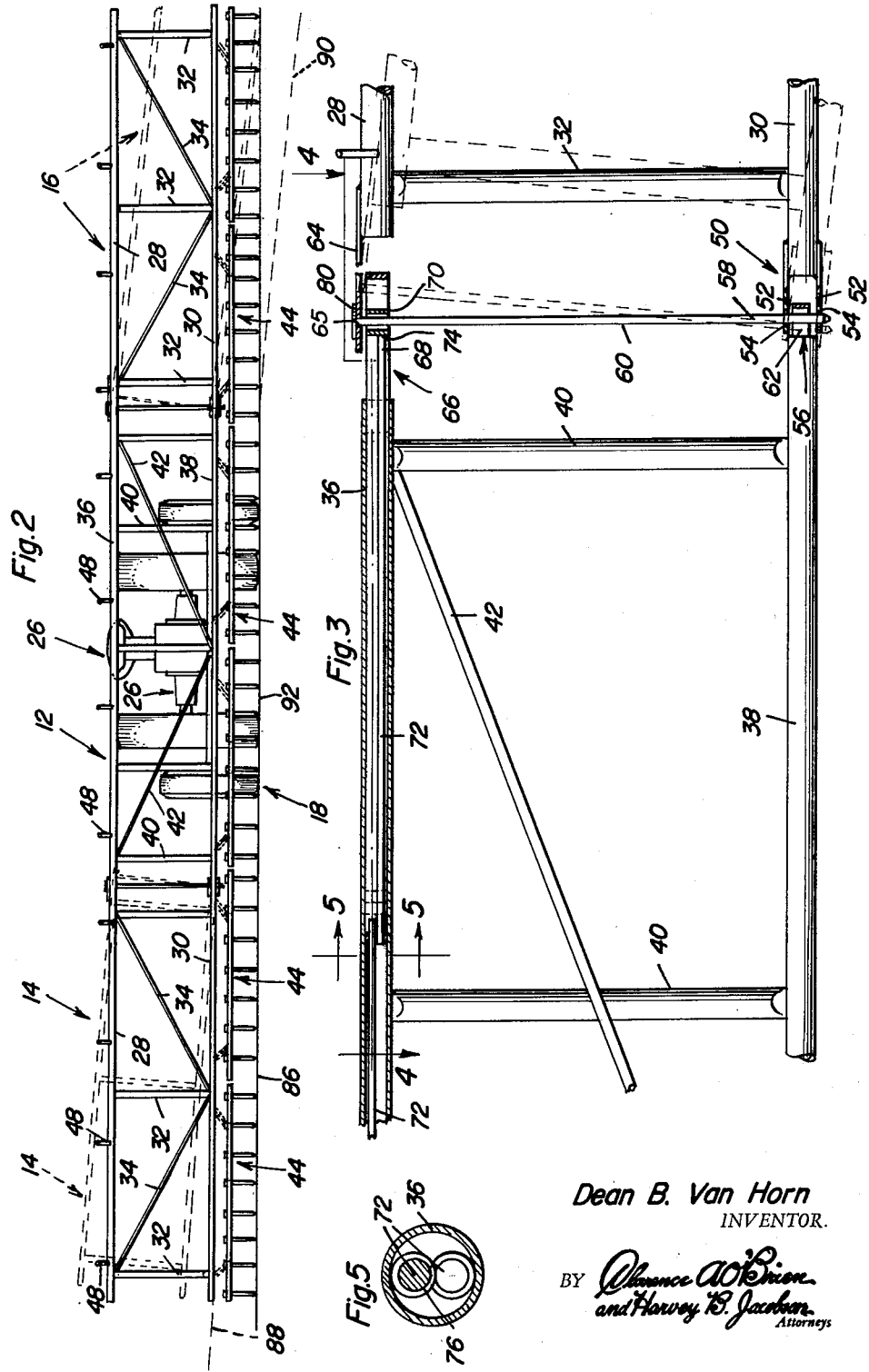
Dean B. Van Horn
INVENTOR.

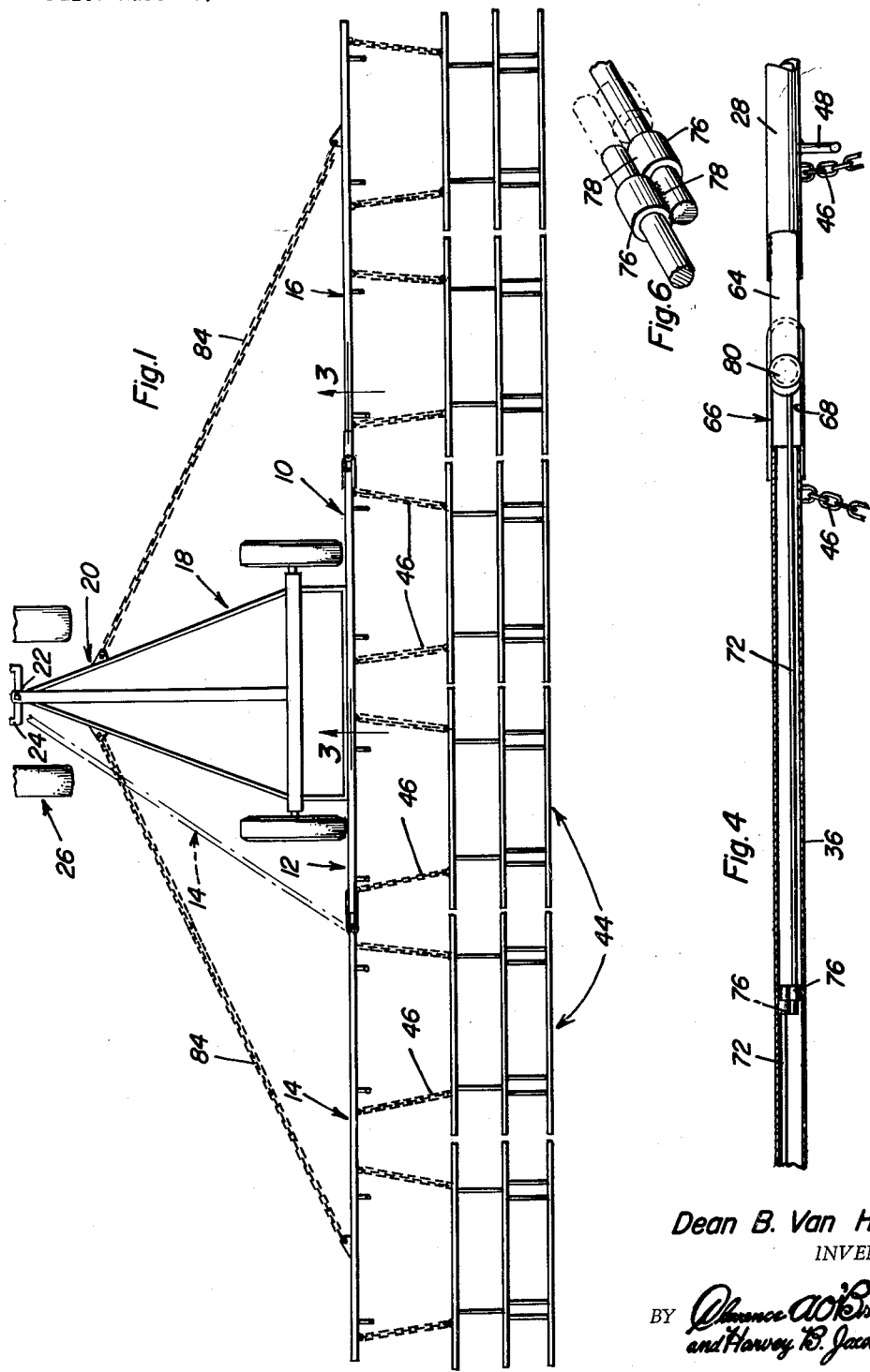

United States Patent Office 3,062,562
Patented Nov. 6, 1962

3,062,562
EQUALIZER FOR HARROW EVENER
Dean B. Van Horn, 605 Howard St., Charles City, Iowa
Filed Mar. 3, 1961, Ser. No. 93,059
9 Claims. (Cl. 280—411)

This invention relates to an equalizer for a harrow evener comprising a part of a harrow assembly including a plurality of harrow sections.

A harrow assembly of the winged type includes an upstanding elongated center section and a pair of upstanding elongated end wing sections which are pivotally secured to the opposite ends of the center section in order that the opposite end or wing sections may be swung from an open position generally aligned with the center section to a closed position overlapping the center section. The harrow assembly is provided with pivotally mounted wing sections in order that the harrow assembly may be readily transported from one field to another over roadways which would be too narrow for the harrow assembly if it were in the extended position and through gate openings in fences dividing one field from another which would also normally be too narrow for the harrow assembly to pass through when in the open or extended position.

In addition to it being desirable to have the opposite end sections of a harrow assembly pivotally secured to the center section for swinging movement through a horizontal plane, it is also desirable to have the opposite end sections mounted for limited swinging movement through a vertical plane whereby each of the harrow assembly sections may more readily be adapted to pass over irregular terrain. With each of the oposite end sections pivotally secured to the center section for movement through a vertical plane, one end section and the center section may be utilized to work a substantially flat and horizontal area while the other end section may be inclined to work a sloped area. However, when pivotally securing the opposite end or wing sections of a harrow assembly for movement in a vertical plane, a means must be provided to support the free ends of the end sections or their weight will cause the end sections to dig into the ground.

Accordingly, it is the main object of this invention to provide a means for supporting the free ends of the opposite end or wing sections without necessitating the use of wing tip wheels on the free ends of the winged sections for engagement with the ground over which the opposite end sections travel.

Each of the opposite end sections of the harrow assembly is mounted for swinging movement through a vertical plane and about a center of rotation adjacent the lower marginal portion of the corresponding end of the center section and the lower marginal portion of that end section. Thus, the free ends of the opposite end sections will have a tendency for their upper portions to swing outwardly away from each other. Accordingly, it is a further object of this invention to provide an equalizer for the harrow assembly which will interconnect the upper ends of the opposite end sections against movement away from each other. As it will oftentimes be necessary for one end section to be pivoted upwardly to conform to irregular terrain, it is a further object of this invention, in accordance with the immediately preceding object, to provide an equalizer which will permit swinging movement of the upper portions of the end sections toward each other.

A final object to be specifically enumerated herein is to provide an equalizer for a harrow assembly which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a conventional form of harrow assembly into which the equalizer of the instant invention has been incorporated;

FIGURE 2 is a rear elevational view of the harrow assembly illustrated in FIGURE 1;

FIGURE 3 is a fragmentary enlarged vertical sectional view taken substantially upon the plane indicated by the section line 3—3 of FIGURE 1;

FIGURE 4 is a fragmentary horizontal sectional view taken substantially upon the plane indicated by the section line 4—4 of FIGURE 3;

FIGURE 5 is a somewhat enlarged vertical section view taken substantially upon the plane indicated by the section line 5—5 of FIGURE 3; and, FIGURE 6 is a perspective view of the overlapped ends of the connecting arms of the equalizer illustrating the manner in which the overlapped ends of the arms are mounted against retraction relative to each other but in a manner to permit movement toward each other.

Referring now more specifically to the drawings the numeral 10 generally designates a harrow assembly including a center section generally referred to by the reference numeral 12 and a pair of opposite end or wing sections generally referred to by the reference numerals 14 and 16.

The center section 12 is rigidly secured to a wheeled frame generally referred to by the reference numeral 18 which is provided with a forwardly directed tongue assembly generally referred to by the reference numeral 20. The tongue assembly 20 is pivotally secured as at 22 to the drawbar 24 of a tractor generally designated by the reference numeral 26.

Each of the end sections 14 and 16 includes a pair of vertically spaced and horizontally disposed frame members 28 and 30 interconnected by means of vertical frame members 32. The sections 14 and 16 are also braced by means of diagonal bracing rods 34 and it will be noted that the center section 12 is similarly constructed and includes upper and lower frame members 36 and 38 interconnected by means of frame members 40 and bracing rods 42.

Each of the sections 12, 14 and 16 has a plurality of harrow sections generally referred to by the reference numeral 44 secured thereto by means of flexible pull members 46. Each of the sections 12, 14 and 16 includes a pair of hanger rods 48 for each of the harrow sections secured thereto on which the harrow sections 44 may be hung when the harrow assembly is not being used.

With particular attention directed now to FIGURES 3 and 4 of the drawings it will be noted that each of the lower portions of the adjacent ends of the end sections 14 and 16 includes a bifurcated journal assembly generally referred to by the reference numeral 50 whose furcations 52 are suitably apertured as at 54. The lower portions of the opposite ends of the center section 12 each includes a journal member generally referred to by the reference numeral 56 which is received between the furcations 52 of the bifurcated journal 50. A rod-like member 58 comprising the lower end of a pivot rod 60 is passed through the aligned apertures 54 and the journal member 56 disposed therebetween. It will be noted that the journal member 56 has an opening 62 formed therethrough which is considerably larger in diameter than the rod-like member 58. Thus, it will be observed that in addition to the lower portions of the adjacent ends of the winged sections 14 and 16 being pivotally secured to the center section 12 for movement about an upstanding axis the end sections 14 and 16 are also swingably secured to the center section 12 for limited movement about a transversely extending horizontally disposed axis.

The adjacent upper portions of the opposite end sections 14 and 16 each include a longitudinally extending and generally horizontally disposed plate 64 which is apertured as at 65 The plate 64 may be secured to the corresponding frame member 28 in any convenient manner such as by welding. The opposite ends of each of the frame members 36 has a horizontally disposed and longitudinally extending guide member generally referred to by the reference numeral 66 secured thereto. The guide member 66 has a slot 68 formed therein in which a journal 70 is slidably disposed. Each of the journals 70 is secured to one end of one of a pair of connecting arms each referred to by the reference numeral 72. The frame member 36 is in the form of a hollow tube and the adjacent ends of the arms 72 are overlapped slightly and are disposed within the tube 36. Each of the journals 70 is secured to the corresponding arm 72 in any convenient manner such as by welding 74.

With attention now directed to FIGURES 5 and 6 of the drawings it will be noted that each of the adjacent ends of the arms is provided with a guide member 76 which is secured thereto in any convenient manner such as by welding 78. Each of the guide members 76 rotatably and slidably receives the adjacent end portion of the other arm 72 and the guide members 76 comprise abutment members for limiting movement of the journals 70 away from each other.

With reference to FIGURE 3 of the drawings it will be noted that the pivot rod 60 has an upper diametrically enlarged end portion 80 which is larger in diameter than the aperture 65. Further, it will be noted that the remainder of the pivot rod 60 is passed through the apertures 65, the journal 70, the aligned apertures 54 and the journal 56 whereby each of the opposite end sections 14 and 16 is pivotally secured to one end of the center section 12 for movement about an upstanding axis and also for limited pivotal movement about a horizontally disposed axis extending transversely of the center section 12.

In operation, the opposite end sections 14 and 16 may be swung outwardly of the center section 12 to the extended position illustrated in solid lines in FIGURE 1 of the drawings. The tension members 84 are secured between the outer ends of the opposite end sections 14 and 16 and the wheeled frame 18 to prevent the end sections 14 and 16 from pivoting rearwardly of the center section 12. The harrow sections 44 may then be unhooked from their suspended positions engaged with the rods 48 and placed upon the ground 86 as indicated in FIGURE 2 with the harrow sections 44 disposed rearwardly of the harrow assembly 10 and secured thereto by means of the pull members 46.

If the tractor 26 and the harrow assembly 10 are moving over uneven terrain such as that illustrated in FIGURE 2 of the drawing with the section 14 passing over a higher part 88 of the ground designated by the reference numeral 86 and with the section 16 passing over a lower or downwardly inclined surface 90 of the ground 86 while the center section 12 is moving over a relatively flat and horizontal section 92 of the ground 86 the free end of the section 16 may be downwardly and outwardly inclined as illustrated in phantom lines to correspond to the inclined portion of the ground 90 and the section 14 may have its free end upwardly and outwardly inclined as illustrated in phantom lines corresponding to the higher ground 88. In this manner the harrow assembly 10 will conform to various types of ground contours to enable the plurality of harrow sections 44 to perform complete and effective operations with the ground 86.

If it is desired, wing tip wheel assemblies (not shown) may be secured to the free ends of the opposite end sections 14 and 16. However, the addition of these wheels is not necessary in view of the manner in which the arms 72 rigidly interconnect the upper ends of the opposite end sections 14 and 16 against movement away from each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An equalizer for a harrow assembly including a plurality of harrow sections, said equalizer comprising an upstanding elongated center section and a pair of upstanding elongated end sections, first means securing each of said end sections to the corresponding end of said center section for swinging movement through a vertical plane and about a center of rotation adjacent the lower marginal portion of that end of said center section and the lower marginal portion of the adjacent end of the corresponding end section, second means securing the upper portion of each of said adjacent ends of said end sections to the adjacent end of said center section for limited guided movement toward and away from said center section in a plane generally paralleling said center section, means interconnecting the upper portions of the adjacent ends of said end sections for independent movement relative to said center section, said sections each adapted to have a plurality of harrow sections secured thereto by means of flexible pull members, said interconnecting means including a lost motion connection between said end sections preventing the movement of the upper portions of the adjacent ends of said end sections away from each other and enabling the movement of said upper portions toward each other.

2. An equalizer for a harrow assembly including a plurality of harrow sections, said equalizer comprising an upstanding elongated center section and a pair of upstanding elongated end sections, first means securing each of said end sections to the corresponding end of said center section for swinging movement through a vertical plane and about a center of rotation adjacent the lower marginal portion of that end of said center section and the lower marginal portion of the adjacent end of the corresponding end section, second means securing the upper portion of each of said adjacent ends of said end sections to the adjacent end of said center section for limited guided movement toward and away from said center section in a plane generally paralleling said center section, means interconnecting the upper portions of the adjacent ends of said end sections for independent movement relative to said center section, said sections each adapted to have a plurality of harrow sections secured thereto by means of flexible pull members, said interconnecting means comprising a pair of connecting arms each secured at one end to said upper portion of one of said end sections and disposed with its other end projecting toward the upper portion of the other of said end sections, said other ends of said arms being overlapped and each having secured thereto a guide slidably receiving the adjacent end of the other arm.

3. An equalizer for a harrow assembly including a plurality of harrow sections, said equalizer comprising an upstanding elongated center section and a pair of upstanding elongated end sections, first means securing each of said end sections to the corresponding end of said center section for swinging movement through a vertical plane and about a center of rotation adjacent the lower marginal portion of that end of said center section and the lower marginal portion of the adjacent end of the corresponding end section, second means securing the upper portion of each of said adjacent ends of said end sections to the adjacent end of said center section for limited guided movement toward and away from said center section in a plane generally paralleling said center section, means interconnecting the upper portions of the adjacent ends of said end sections for independent movement relative to said center section, said sections each adapted to have a plurality of harrow sections secured thereto by means of flexible pull members, the upper portions of the adjacent ends of said end sections each including a horizontally disposed plate having an aperture formed therein, the upper portions of the opposite ends of said center section each including a generally horizontally disposed guide member having a longitudinally extending slot formed therein, said apertures each being registered with the corresponding slot, said second securing means comprising a rod-like element disposed through said registered slots and apertures.

4. The combination of claim 3 wherein the lower portions of the adjacent ends of said end sections each include a bifurcated journal and each of the lower portions of the opposite ends of said center section includes a journal member disposed between and aligned with the furcations of the corresponding bifurcated journal, said first securing means including a rod-like member loosely disposed through corresponding journal members and bifurcated journal.

5. The combination of claim 4 wherein corresponding ones of said rod-like members and elements comprise upper and lower portions respectively of a pair of pivot rods, each of said pivot rods including an upper diametrically enlarged head portion of a diameter greater than the diameter of the corresponding aperture.

6. The combination of claim 5 wherein said interconnecting means comprises a pair of connecting arms each having on one end a journal disposed in one of said slots and slidably and rotatably receiving the corresponding pivot rod, the other ends of said connecting arms being overlapped and each including a guide slidably receiving the adjacent portion of the other connecting arm.

7. The combination of claim 4 wherein said center section includes an upper longitudinally extending and hollow header tube, the adjacent end portions of said arms being slidably received in said tube.

8. A harrow assembly equalizer comprising an upstanding center section and a pair of upstanding end sections, first means securing each of said end sections to the corresponding end of said center section for swinging movement through a vertical plane and about a center of rotation adjacent the lower marginal portion of that end of said center section and the lower marginal portion of the adjacent end of the corresponding end section, and means interconnecting the upper portions of the adjacent ends of said end sections for independent movement relative to said center section, said interconnecting means includes a lost motion connection between said end sections preventing the movement of the upper portions of the adjacent ends of said end sections away from each other and enabling the movement of said upper portions toward each other.

9. A harrow assembly equalizer comprising an upstanding center section and a pair of upstanding end sections, first means securing each of said end sections to the corresponding end of said center section for swinging movement through a vertical plane and about a center of rotation adjacent the lower marginal portion of that end of said center section and the lower marginal portion of the adjacent end of the corresponding end section, second means securing the upper portion of each of said adjacent ends of said end sections to the adjacent end of said center section for limited guided movement toward and away from said center section in a plane generally paralleling said center section, the upper portions of the adjacent ends of said end sections each including a horizontally disposed plate having an aperture formed therein, the upper portions of the opposite ends of said center section each including a generally horizontally disposed guide member having a longitudinally extending slot formed therein, said apertures each being registered with the corresponding slot, said second securing means comprising a rod-like element disposed through said registered slots and apertures.

References Cited in the file of this patent

UNITED STATES PATENTS

| | | |
|---|---|---|
| 1,927,458 | Klise | Sept. 19, 1933 |
| 2,750,204 | Ohrmann | June 12, 1956 |
| 2,787,477 | Melroe | Apr. 2, 1957 |
| 2,978,042 | Jones | Apr. 4, 1961 |